Patented Dec. 1, 1953

2,661,352

UNITED STATES PATENT OFFICE 2,661,352

7-SUBSTITUTED DIALKYL XANTHINES AND PROCESS OF PREPARING SAME

Wolffe Harry Feinstone, Indianapolis, Ind., and Bernard F. Duesel, Yonkers, N. Y., assignors to Nepera Chemical Co. Inc., Yonkers, N. Y., a corporation of New York No Drawing. Application April 2, 1952, Serial No. 280,166

11 Claims. (Cl. 260—254)

This invention relates to a new class of therapeutic compounds and, in particular, relates to new condensation products obtained by reacting dimethylxanthines and 8-substituted dimethylxanthines with quaternary ammonium hydroxides.

The therapeutic importance of the two dimethylxanthines, theobromine and theophylline, and their 8-substituted derivatives, is well known. These xanthines are weak alkaloids slightly soluble in water and, therefore, not too well adapted for administration. They form soluble double salts and additional salts with a number of compounds. For parenteral administration, it has heretofore been necessary to employ one of these injectable soluble salts. The main object of preparing these double salts has been to increase the solubility of the dimethylxanthines and to reduce the gastric irritation caused by the free alkaloid.

The therapeutic preparations of these xanthines heretofore known are mostly mixtures of the alkaloid and an organic acid salt, though the alkaloids form addition compounds with some bases, such as ethylenediamine, dimethanolamine and the like.

We have now found that we can produce a condensation product between a dimethylxanthine, or an 8-substituted dimethylxanthine, and a quaternary ammonium hydroxide by splitting off one mole of water. These new compounds are very soluble in water and well adapted for oral and parenteral administration. Other valuable properties of these compounds will be seen in the specification.

In referring to the substituted xanthines, we use the recognized nomenclature in which the atoms constituting the conjugated xanthine structure are designated as shown below:

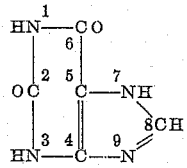

There are three N-dimethyl xanthines, all of which can be used to prepare the new compounds of our invention, namely, 1,3-dimethylxanthine (theophylline); 3,7-dimethylxanthine (theobromine); and 1,7 - dimethylxanthine (paraxanthine). The related alkaloid caffeine, in which all three hydrogen atoms are replaced with methyl groups, cannot be reacted with quaternary ammonium hydroxide compounds, and so cannot be used as a parent substance for our new compounds. However, when the hydrogen on the 8 carbon atom of a dimethylxanthine is substituted by chlorine, bromine, a nitro group or other modifying atom or radical, our reaction can be effected and the new compounds produced have varying degrees of therapeutic activity, depending on the substituent.

We can also prepare new compounds according to our invention by starting with dialkylxanthines in which, instead of methyl groups, other lower alkyl groups are present. Thus we can use diethylxanthines, or methylethylxanthines, as well as their 8-substituted derivatives, but the resulting compounds are less important therapeutically.

As already stated, our new compounds are condensation products between dimethylxanthines and quaternary ammonium hydroxides. One mole of water splits off in the reaction according to the following probable general reaction:

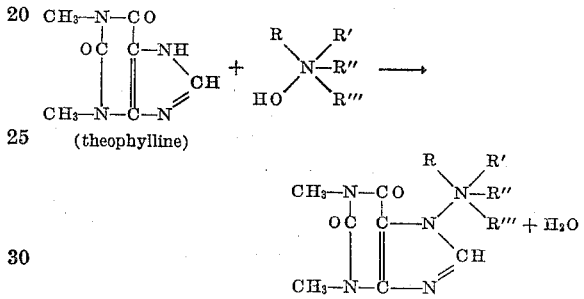

in which R', R" and R''' are lower alkyl groups such as methyl or ethyl; they are generally, but not necessarily, alike, and R may be a long chain alkyl group, or may be further substituted with hydroxy, alkoxy, or aryl groups.

As quaternary ammonium hydroxides, we use trimethylbenzylammonium hydroxide or compounds with a long alkyl chain like trimethylhexylammonium hydroxide, trimethyloctylammonium hydroxide, and others where the long alkyl chain may contain up to 15 carbon atoms. For therapeutic purposes, the most interesting quaternary ammonium hydroxide we have used is trimethylhydroxyethylammonium hydroxide. This compound is known as choline, a product found in many plants and animal organs. An additional advantage derived in using choline is that the resulting soluble new compound has therapeutic activity depending on its choline content (muscarinic, nicotinic and curariform) as well as those depending on the alkaloid residue of our new compounds.

In general, we prepare our new compounds by dissolving the freshly prepared quaternary ammonium base with the selected xanthine in an anhydrous solvent, refluxing to complete the reaction and crystallizing the product by cooling.

The following are several illustrative examples of some of the preferred procedures of carrying out our invention, which are given for illustration and not for limitation.

Example 1

418.8 grams of choline chloride (3 mols) were dissolved in 360 ml. of warm methanol and added to a solution of 198 grams of potassium hydroxide (85%) in 480 ml. of methanol. The formed potassium chloride precipitated out and was collected on a filter. The filter cake was washed with 600 ml. of isopropanol. The filtrate containing the choline base (trimethylhydroxyethyl-ammonium hydroxide) was poured into a boiling suspension of 540 grams (3 mols) of theophylline (1,3-dimethylxanthine) in 4 liters of isopropanol. The reaction mixture was then refluxed for half an hour, all the reactants were dissolved, and then the reaction mixture was cooled and allowed to stand until the precipitation was complete. The precipitate was collected on a Buchner filter, washed with 150 ml. of isopropanol and dried at 110° C. For purification, it was recrystallized from isopropanol. The yield was 767 grams, or 85% of the theory. The condensation product of choline and theophylline, $C_{12}H_{21}O_3N_5$, forms small white prisms when crystallized out of isopropanol. Its melting point is 186.5—187° C. In elementary analysis, there was found N=24.6%; C=51.3%; H=7.53%; (theory N=24.8%; C=51.0%; H=7.47%).

The new compound is very soluble in water, slightly soluble in alcohol or chloroform, and insoluble in benzene, acetone, ether and ligroin. It is insoluble in alkalies and decomposes in acids.

Example 2

6.97 grams of choline chloride (0.05 mols) were dissolved in a mixture of 11 ml. of methanol and 10 ml. of isopropanol and added to a solution of 3.35 grams of potassium hydroxide (85%) in 11 ml. of methanol. The formed potassium chloride was collected on a filter and the filter cake was washed with 20 ml. isopropanol. The filtrate, containing the choline base was poured into a suspension of 12.95 grams (0.05 mol) of 8-bromotheophylline in 115 ml. of boiling isopropanol. The reaction mixture was refluxed until a complete solution was obtained. This was then filtered and the filtrate evaporated on a steam bath to dryness. The residue was recrystallized from a mixture of 35 ml. of benzene and 15 ml. of isopropanol. After a second recrystallization and drying in a vacuum desiccator, the melting point of the condensation product of choline and bromotheophylline, $C_{12}H_{20}O_2N_5Br$, was 65° C. The yield obtained was 12.5 grams, or 69% of theory. In a nitrogen analysis (Micro-Dumas) there was found: N=18.85% (theory=19.3%).

The new compound is very soluble in water, soluble in alcohol and acetone, slightly soluble in benzene and chloroform, and insoluble in ether and ligroin. It is insoluble in alkalies and decomposes in acids.

Example 3

Choline base was prepared from 6.97 grams (0.05 mols) of choline chloride and reacted with 10.73 grams (0.05 mols) of 8-chlorotheophylline as in Example 2. After it has been recrystallized twice, the condensation product of choline and 8-chlorotheophylline, $C_{12}H_{20}O_3N_5Cl$, melts at 97–99° C. The yield obtained was 12.2 grams, or 77% of theory. In a nitrogen analysis (Micro-Dumas) there was found: N=21.13% (theory: 22.05%).

The new compound is very soluble in water, alcohol and acetone, slightly soluble in chloroform and benzene, and insoluble in ether and ligroin. It is insoluble in alkalies and decomposes in acids.

Example 4

Choline base was prepared from 2.01 grams (0.0144 mols) of choline chloride as in the previous examples and the filtrate containing said base was poured into a suspension of 3.76 grams (0.0144 mols) of 8-nitrotheophylline dihydrate in 85 ml. of isopropanol and refluxed for about 15 minutes. There was no complete solution at the end of the refluxing. The reaction mixture was then cooled and the precipitate collected. This was then recrystallized from 100 ml. ethanol (90%). The crystals were washed with ethanol and dried in a vacuum at 60° C. The condensation product of choline and 8-nitrotheophylline, $C_{12}H_{20}O_5N_6$, forms canary yellow prisms, which melt at 248° C. The yield obtained was 2.0 grams, or 43% of theory. In a nitrogen analysis there was found N=25.4% (theory 25.6%).

The new compound is very soluble in water, slightly soluble in alcohol, acetone and chloroform, and insoluble in ether, benzene and ligroin. It is insoluble in alkalies and decomposes in acids.

Example 5

Choline base was prepared from 8.74 grams (0.0625 mols) of choline chloride, as in the previous examples. To the filtrate containing said base 11.28 grams (0.0625 mols) of theobromine (3,7-dimethylxanthine) was added and the reaction mixture was heated on a steam bath for half an hour. The reaction mixture was allowed to stand for 2 additional hours at room temperature, and then filtered. The filtrate was concentrated on a steam bath until crystallization began to take place and then cooled on ice. The collected product was recrystallized from 50 ml. isopropanol, washed with isopropanol and dried in a vacuum. The condensation product of choline and theobromine, $C_{12}H_{21}O_3N_5$, forms small white prisms, which melt at 178.5–179.5° C. The yield obtained was 10.7 grams, or 61% of theory. In a nitrogen analysis (Micro-Dumas) there was found N=24.2% (theory 24.7%).

The new compound is very soluble in water, slightly soluble in alcohol and chloroform, and insoluble in ether, acetone, benzene and ligroin. It is insoluble in alkalies and decomposes in acids.

The compounds prepared according to our invention represent a valuable group of new therapeutic agents. They are much more soluble in water than theophylline and the pH of their solution is much nearer to neutral than that of theophylline. Typical properties are given in the following table:

|  | Solubility at Room Temperature | pH of 0.8% Aqueous Solution |
| --- | --- | --- |
| Theophylline | 1:120 | 4.8 |
| Choline-theophylline | 1:1 | 9.7 |
| Choline-8-chloro-theophylline | 1:1 | 7.9 |
| Choline-8-bromo-theophylline | 1:1 | 8.7 |
| Choline-8-nitro-theophylline | 1:1.5 | 7.3 |

The above table shows that the solubility of the new compounds is about 100 times that of theophylline. Their pH is on the alkaline side, but much closer to neutral than theophylline is on the acid side. They may be buffered to pH 7.0 quite readily with the usual buffer salts. Other new compounds made according to our invention have similarly enhanced solubility and pH relationships.

It can be readily seen that by a slight change of the alkyl radicals on either of the two components entering into the condensation, many apparently widely different embodiments of this invention may be made without departing from the spirit thereof.

We do not limit ourselves to the specifically mentioned times, temperatures, quantities, chemicals, or steps of procedure as these are given simply to clearly describe our invention as set forth in our specification and claims and they may be varied without going beyond the scope of our invention.

What we claim is:

1. The process of producing new therapeutic agents comprising the steps of reacting a quaternary ammonium hydroxide of the formula

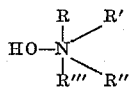

in which R is selected from the group consisting of long-chain alkyl radicals containing up to fifteen carbon atoms, hydroxy lower alkyl radicals and benzyl radicals, and R', R'' and R''' are alkyl radicals containing one to three carbon atoms, with an 8-substituted dialkylxanthine in which the alkyl group contains from one to two carbon atoms and in which the 8-substituent is selected from the group consisting of chloro, bromo and nitro, isolating the condensation product and purifying it by recrystallization.

2. The process of producing new therapeutic agents comprising the steps of reacting a quaternary ammonium hydroxide of the formula

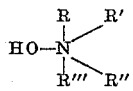

in which R is selected from the group consisting of long-chain alkyl radicals containing up to fifteen carbon atoms, hydroxy lower alkyl radicals and benzyl radicals, and R', R'' and R''' are alkyl radicals containing one to three carbon atoms, with an 8-substituted dialkylxanthine in which the alkyl group contains from one to two carbon atoms and in which the 8-substituent is selected from the group consisting of chloro, bromo and nitro, in a substantially anhydrous solvent, isolating the condensation product and purifying it by recrystallization.

3. The process of producing new therapeutic agents comprising the steps of reacting a quaternary ammonium hydroxide of the formula

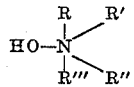

in which R is selected from the group consisting of long-chain alkyl radicals containing up to fifteen carbon atoms, hydroxy lower alkyl radicals and benzyl radicals, and R', R'' and R''' are alkyl radicals containing one to three carbon atoms, with an 8-substituted dimethylxanthine in which the 8-substituent is selected from the group consisting of chloro, bromo and nitro, isolating the condensation product and purifying it by recrystallization.

4. The process of producing new therapeutic agents comprising the steps of reacting a quaternary ammonium hydroxide of the formula

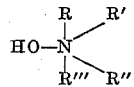

in which R is selected from the group consisting of long chain alkyl radicals containing up to fifteen carbon atoms, hydroxy lower alkyl radicals and benzyl radicals, and R', R'' and R''' are alkyl radicals containing one to three carbon atoms, with 1,3-dimethyl, 8-bromoxanthine, and isolating the condensation product.

5. The process of producing new therapeutic agents comprising the steps of reacting a quaternary ammonium hydroxide of the formula

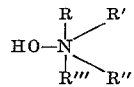

in which R is selected from the group consisting of long chain alkyl radicals containing up to fifteen carbon atoms, hydroxy lower alkyl radicals and benzyl radicals, and R', R'' and R''' are alkyl radicals containing one to three carbon atoms, with 1,3-dimethyl, 8-chloroxanthine, and isolating the condensation product.

6. The process of producing new therapeutic agents comprising the steps of reacting a quaternary ammonium hydroxide of the formula

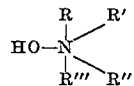

in which R is selected from the group consisting of long chain alkyl radicals containing up to fifteen carbon atoms, hydroxy lower alkyl radicals and benzyl radicals, and R', R'' and R''' are alkyl radicals containing one to three carbon atoms, with 1,3-dimethyl, 8-nitroxanthine, and isolating the condensation product.

7. Compounds having the general formula

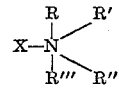

in which R is selected from the group consisting of long-chain alkyl radicals containing up to fifteen carbon atoms, hydroxy lower alkyl radicals and benzyl radicals, and R', R'' and R''' are alkyl radicals containing one to three carbon atoms and X is an 8-substituted dialkylxanthine in which the alkyl group contains from one to two carbon atoms and in which the 8-substituent is selected from the group consisting of chloro, bromo and nitro.

8. Compounds having the general formula

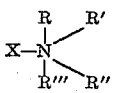

in which R is selected from the group consisting of long-chain alkyl radicals containing up to fifteen carbon atoms, hydroxy lower alkyl radicals and benzyl radicals, and R', R'' and R''' are alkyl radicals containing one to three carbon atoms and X is an 8-substituted dimethylxanthine in which the 8-substituent is selected from the group consisting of chloro, bromo and nitro.

9. The product of the formula

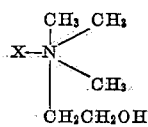

wherein X is a 1,3-dimethyl-8-bromo-xanthine radical, said compound being a white crystalline product of the empirical formula $C_{12}H_{20}O_3N_5Br$, melting at about 65° C.

10. The product of the formula

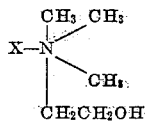

wherein X is a 1,3-dimethyl-8-chloro-xanthine radical, a white crystalline product of the empirical formula $C_{12}H_{20}O_3N_5Cl$, melting at about 97–99° C.

11. The product of the formula

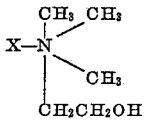

wherein X is a 1,3-dimethyl-8-nitro-xanthine radical, a canary yellow crystalline product of the empirical formula $C_{12}H_{20}O_5N_6$, melting at about 248° C.

WOLFFE HARRY FEINSTONE.
BERNARD F. DUESEL.

References Cited in the file of this patent

UNITED STATES PATENTS

| Number | Name | Date |
|---|---|---|
| 2,590,126 | Robinson | Mar. 25, 1952 |